(No Model.)　　　　　　　　　　　　　　　　2 Sheets—Sheet 1.
F. A. FORD.
MOLD FOR MEASURING AND PARTIALLY SHAPING CIGAR FILLERS.
No. 362,267.　　　　　　　　　Patented May 3, 1887.
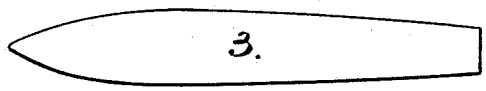
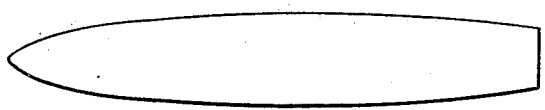
Fig. 1.
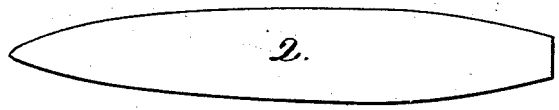
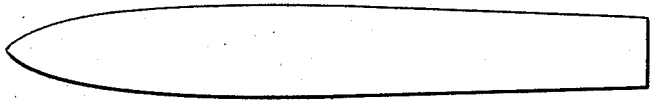
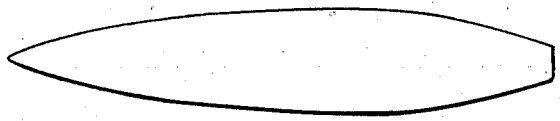
Witnesses　　　　　　　　　　　　　　Inventor
Chas. H. Smith　　　　　　　　　　　Frederick A. Ford.
H. L. Serrell　　　　　　　　　per Lemuel W. Serrell
　　　　　　　　　　　　　　　　　　　atty (No Model.) 2 Sheets—Sheet 2.
F. A. FORD.
MOLD FOR MEASURING AND PARTIALLY SHAPING CIGAR FILLERS.
No. 362,267. Patented May 3, 1887.
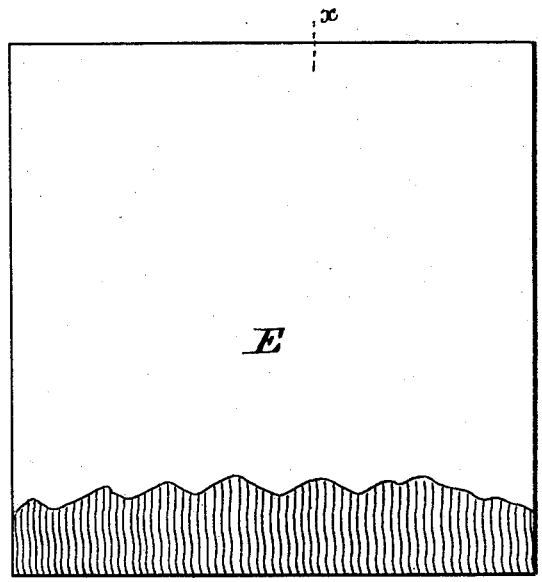
Fig. 2.
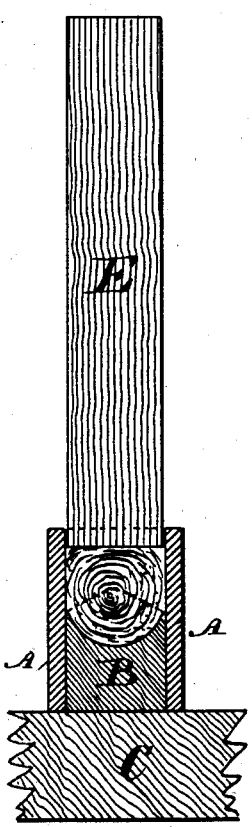
Fig. 3.
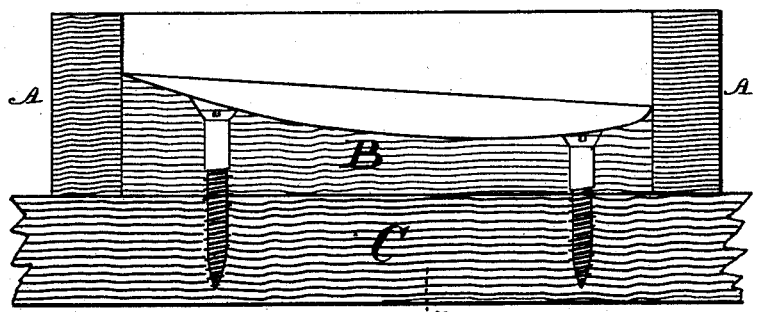
Fig. 4.
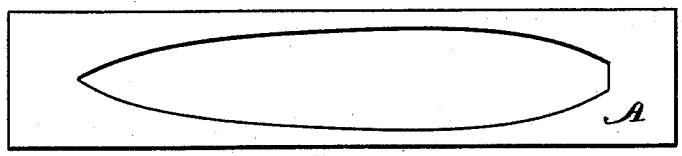
Fig. 5.
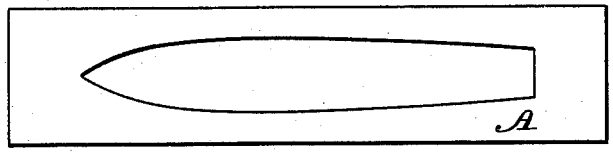
Witnesses
Chas. H. Smith
W. L. Serrell
Inventor
Frederick A. Ford
per Lemuel W. Serrell
atty

UNITED STATES PATENT OFFICE.

FREDERICK A. FORD, OF NEW YORK, N. Y.

MOLD FOR MEASURING AND PARTIALLY SHAPING CIGAR-FILLERS.

SPECIFICATION forming part of Letters Patent No. 362,267, dated May 3, 1887.

Application filed July 26, 1886. Serial No. 209,097. (No model.)

*To all whom it may concern:*

Be it known that I, FREDERICK A. FORD, of the city and State of New York, have invented an Improvement in Molds for Measuring and Partially Shaping Cigar-Fillers, of which the following is a specification.

In the manufacture of cigars it is usual for the operative to grasp the leaves and pieces of tobacco in the hand and give to the same a shape corresponding generally to the cigar when made—that is to say, the largest quantity of material is to be in the central portion of the cigar and less toward the ends; but in consequence of inexperience, lack of dexterity, and the absence of any regular measure or form, these fillers vary considerably, both in quantity of tobacco and in the shape that is given to the fillers.

The object of the present invention is to furnish cheap and convenient molds for measuring the quantity of tobacco introduced into each filler, and at the same time giving to the filler a shape approximating that of the finished cigar, in order that all portions of the filler may be equally dense, or nearly so, and hence smoke with uniformity throughout.

In the drawings, Figure 1 illustrates some of the shapes that are given to peculiar styles of cigars. Fig. 2 is a vertical section of a mold with my improvement. Fig. 3 is a vertical section at *x x*, Fig. 2. Fig. 4 is a plan view of the mold shown in Figs. 2 and 3, and Fig. 5 is a plan view of a mold of different shape.

I employ a block, A, of wood or similar material, with an opening or mortise entirely through it. The sides of this opening are usually perpendicular to the base of the block, and the shape or horizontal contour of this opening depends upon the shape that is to be given to the cigar. The shape of the opening shown in Figs. 2, 3, and 4 is such that the cigar when made up will assume the form, or nearly so, represented at 2, Fig. 1, and the shape of the opening shown in Fig. 5 is such that the cigar will assume the form, or nearly so, shown at 3, Fig. 1.

There is a base-piece, B, attached to the table *c*, and this base-piece is of the same horizontal shape as the opening in the block or mold with which it is to be used, so that the block or mold will set freely over the base-piece and be steadied thereby while being filled. The vertical height of this base-piece usually varies, and the ends are highest, as shown in Fig. 2, so as to fill up the end parts of the mold more than the middle, in order that when the operative packs into the mold the tobacco there may be less at the head end of the cigar than at the tuck or at the middle, as may be required.

The upper surface of this base-piece is shown as inclined and concave or hollowed out. The height of this base and the shape of its upper surface may be varied according to the shape of the cigar that is being made.

The mold becomes a measure for the proper quantity of tobacco for each filler, as well as a means for giving the filler the proper shape approximating to that of the complete cigar, and by making the base-piece higher the mold will contain less tobacco, and more when the base-piece is lower.

I provide a plunger, E, of suitable length, and of a shape sectionally the same, or nearly so, as the opening in the mold. The operative lifts the mold and its contents and transfers the same to the machine for binding the cigar-fillers, then enters the lower end of the plunger into the mold upon the filler-tobacco, and therewith drives out the contents of the mold into the loop or pocket of the rolling-machine, or upon the binder, if the rolling operation is performed by hand. In either case the tobacco is discharged from the mold upon the apron of the binding-machine, or upon the binder itself, by pressing down upon the plunger and lifting up the mold. It is preferable to slide the mold up the plunger and remove it while holding the filler down in place with the lower end of the plunger.

I claim as my invention—

The table *c* and the base-piece B, fastened upon the surface thereof, in combination with the movable mold formed of a block with an opening passing entirely through it, the base-piece and the opening approximating in shape to the cigar that is to be made, and a plunger for discharging the tobacco from the mold after the latter has been lifted off the base-piece, substantially as set forth.

Signed by me this 19th day of July, 1886.

FREDERICK A. FORD.

Witnesses:
 GEO. T. PINCKNEY,
 WALLACE L. SERRELL.